Patented July 26, 1938

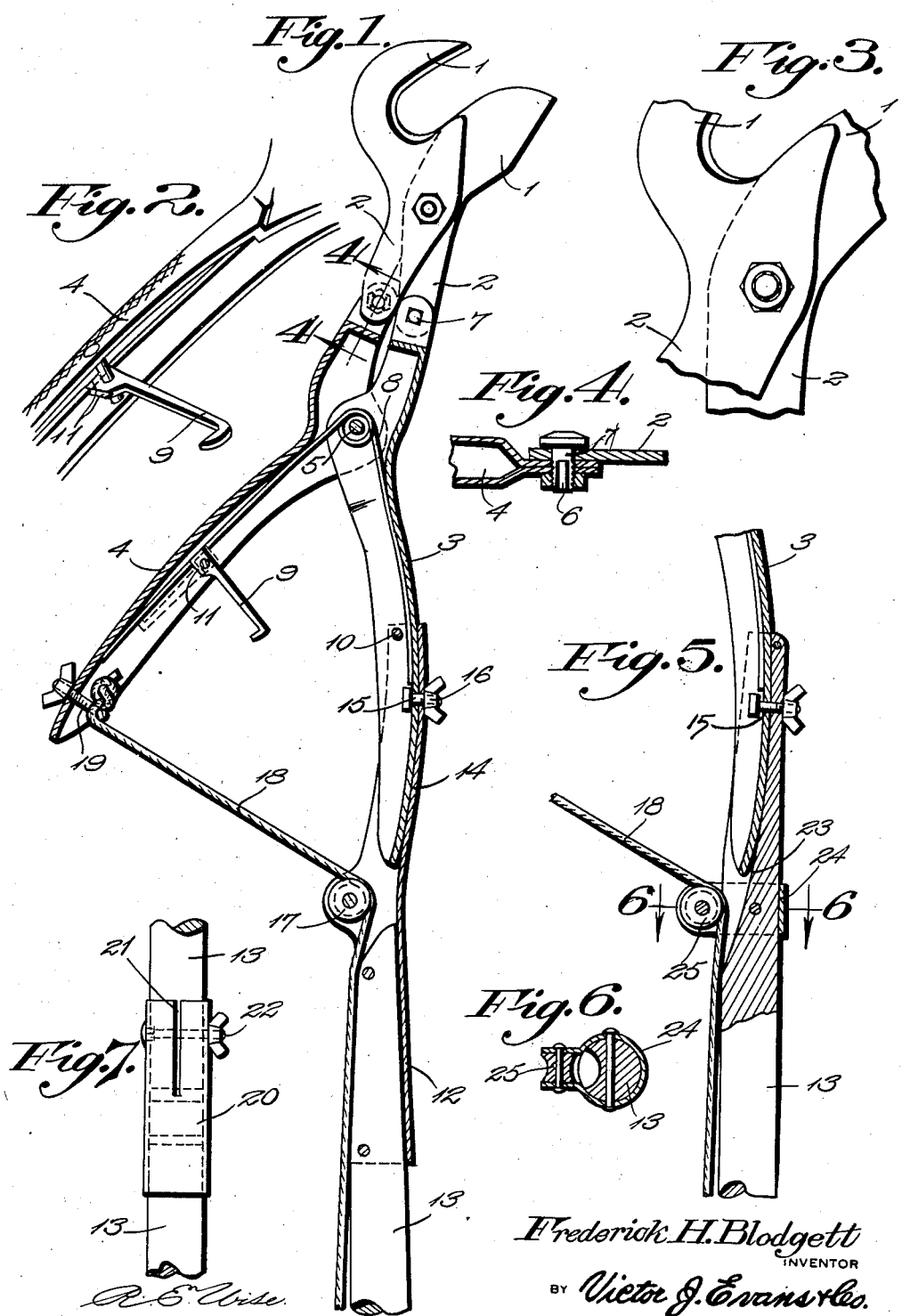

2,125,217

UNITED STATES PATENT OFFICE 2,125,217

PRUNING SHEARS

Frederick H. Blodgett, Bellows Falls, Vt.

Application January 5, 1937, Serial No. 119,149

1 Claim. (Cl. 30—262)

This invention relates to pruning shears of the character set forth in my United States Letters Patent Numbers 1,716,257 and 1,572,100 and has for the primary object the provision of improved handles for the actuation of the cutting blades and also improved means for connecting the extension pole on one of the handles.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view illustrating pruning shears constructed in accordance with the present invention.

Figure 2 is a fragmentary perspective view showing one of the handles with a fastening hook applied thereto.

Figure 3 is a fragmentary plan view showing the pivotal connection between the blades.

Figure 4 is a detail sectional view taken on the line 4—4 of Figure 1.

Figure 5 is a fragmentary sectional view showing a modified means of securing an extension pole to one of the handles.

Figure 6 is a detail sectional view taken on the line 6—6 of Figure 5.

Figure 7 is a fragmentary side elevation showing a coupling sleeve employed for connecting sections of the pole.

Referring in detail to the drawing, the numeral 1 indicates pivotally connected blades similar in construction to the blades described in the patents above referred to and each including a shank 2. Handles 3 and 4 are provided for the actuation of the blades 1. The handles are of channeled construction and are pivotally connected together, as shown at 5, and to the shanks 2, as shown at 7. The pivotal connection 7 consists of a bolt having flattened faces 6 and the opening in the handle 4 has flattened walls to match the flattened faces of the bolt. The bolt which pivotally connects the blades 1 together is of ordinary construction as is the bolt employed for pivotally connecting the handles. The pivot 5 which connects the handles is located closer to one end of the handles than the opposite end and the shorter ends of the handles have the channeled portions terminating short thereof to provide ears to be pivoted to the shanks 2 by the pivots 7. A spring 8 is supported by the pivot 5 and bears against the inner walls of the handles to urge the free ends of the handles away from each other and thereby open the blades ready to receive a branch of a tree for cutting. The handle 4 has pivoted thereto a hook 9 to engage with a keeper 10 carried by the handle 3 for retaining the handles in close relation and the blades closed when the tool is not in use. The pivoted end of the hook 9 is enlarged and provided with angularly related faces 11 which ride against the spring 8 for either retaining the hook in a position at right angles to the handle 4 or in parallelism therewith.

A ferrule 12 is secured to a pole 13 and is provided with an extension 14 curved to conform to the contour of the handle 3 and receives a portion of said handle therein. A bolt 15 having a wing nut 16 secures the extension 14 to the handle 3. A roller 17 is journaled to the extension of the ferrule 12 over which is trained a flexible element 18. One end of the flexible element is secured to the handle 4 by a fastener 19 preferably in the form of an eye bolt having a wing nut. The flexible element 18 is employed for moving the handle 4 towards the handle 3 while the tool is supported by the pole. The handle 4 moving towards the handle 3 moves the blades into cutting position. The pole 13 may be composed of sections detachably connected by a sleeve 20 riveted or otherwise secured to one section and has a portion thereof split, as shown at 21, to receive the other section and through which a bolt 22 extends for drawing the split portion of the sleeve tightly against the last-named section of the pole.

Referring to my form of invention shown in Figures 5 and 6, one end of the pole may be cut away or grooved, as shown at 23, to receive a portion of the handle 3 and is secured thereto by the bolt 15. A clip 24 is secured to the pole at one end of the grooved portion and rotatably supports a pulley 25 over which the flexible element 18 is trained.

What is claimed is:

A pruning tool comprising pivotally connected handles each of channeled construction, a spring within said construction and bearing against said handles to force them apart, a keeper carried by one of the handles, a hook pivoted to the other handle to engage and disengage with the keeper and having its pivoted end enlarged and provided with angularly related faces engaged by the spring for holding the hook either in a position to engage with the keeper or in parallelism within the handle to which it is pivoted.

FREDERICK H. BLODGETT.